(No Model.)
N. PETRY.
SAW.
No. 398,079. Patented Feb. 19, 1889.
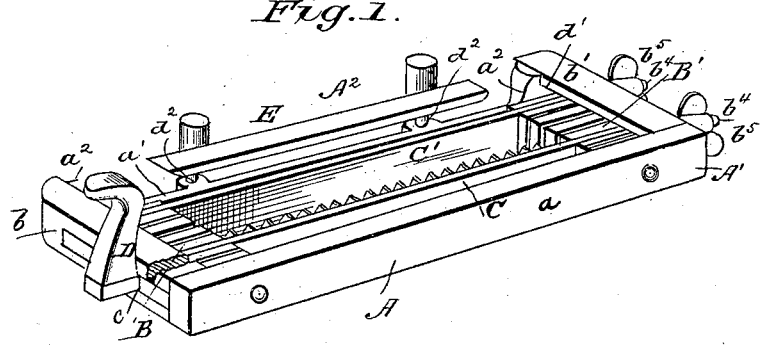
WITNESSES:
Fred G. Dieterich
Chas. R. Wright
INVENTOR:
N. Petry
BY Munn & Co.
ATTORNEYS.

UNITED STATES PATENT OFFICE.

NICHOLAS PETRY, OF ROCKPORT, MISSOURI.

SAW.

SPECIFICATION forming part of Letters Patent No. 398,079, dated February 19, 1889.

Application filed July 29, 1887. Serial No. 245,650. (No model.)

*To all whom it may concern:*

Be it known that I, NICHOLAS PETRY, of Rockport, in the county of Atchison and State of Missouri, have invented a new and useful Improvement in Tenon, Gaining, and Crosscut Saws, of which the following is a specification.

The object of my invention is to provide a saw for sawing tenons and gains whereby the time and labor of measuring the same is avoided.

The invention consists in the peculiar construction and arrangement of parts, as hereinafter fully described, and pointed out in the claims.

Reference is to be had to the accompanying drawings, in which similar letters of reference indicate corresponding parts in all the figures.

Figure 1 is a perspective view. Fig. 2 is a plan view partly in section. Figs. 3 and 4 are detail views.

A is the frame, consisting of the parts A' A². The part A' is composed of the side piece, $a$, and the end pieces, $b\ b'$, which are provided with the slots $c\ c'$ adjacent to the side piece, $a$, and with the grooves $d\ d'$ on their inner faces. The part A² is composed of a flanged bar, $a'$, and is provided with the upwardly-projecting lugs $a^2$ near its ends, having laterally-projecting flanges $a^3$, which fit in the grooves $d\ d'$ of the end pieces of the part A', and are held adjustable therein by means hereinafter described.

B B' are the saw heads or holders, which are provided with a series of grooves or slits, $b^2$, for the reception of the saw-blades C C', which are secured therein by bolts or rods which pass through the side piece, $a$, of the part A' and through the said heads and saws, as clearly shown in the drawings.

The heads B B' are provided with shanks $b^3$, which fit in the slots $c\ c'$ of the end pieces, $b\ b'$. The shank of the head B is rigidly secured in the slot $c$ and projects through the end piece $b$, and is provided with the handle D. The shank $b^3$ of the head B' fits loosely in the slot $c'$ of the end piece $b'$, and consists of two projecting bars or rods having their outer ends screw-threaded at $b^4$, upon which are thumb-nuts $b^5$, by means of which the tension of the saws are regulated. This tension device for the saws also serves to hold the part A² firmly to the part A', for when the saws are under tension the end pieces, $b\ b'$, of the part A' will be drawn together, so as to bind the part A² firmly in place.

E is a gage-guide bar for regulating the depth of cut, and thereby the length of tenon. The guide-bar E is provided with two downwardly-projecting shanks or saws, $d^2$, which pass through apertures in the flange of the bar $a$ of the part A², and are adjustably held therein by set-screws $d^3$. The rods or shanks of the guide-bar may be graduated to facilitate the adjustment of the said guide-bar. The crosscut-saw blades will be provided with elongated apertures or slots in the ends, as shown in Fig. 4, and one-half of the rip-saws will have slots. By means of these slots one saw can be dropped down below the other, to permit tenons having one side longer than the other to be cut, or both saws can be dropped, so as to cut dados or tenon cut-offs. When both saws are lowered, the frame forms a gage, limiting the depth of cut. The saws can be secured in any of the grooves or slits of the heads B B', so that tenons of various widths can be cut.

Having thus described my invention, what I claim, and desire to secure by Letters Patent, is—

1. A saw-frame consisting of the parts A' A², the part A' being provided with grooved end pieces, $b\ b'$, and the part A² provided with flanges $a^3$, fitting in the grooves of the said end pieces, and saw-heads carried by the end pieces of the part A', one of the said heads being movable and the other stationary, substantially as herein shown and described.

2. The combination, with a saw-frame consisting of the part A', provided with the grooved and slotted end pieces, $b\ b'$, and the part A², provided with the flanges $a^3$, of the saw-heads B B', the head B being rigidly secured to the end piece $b$ of the part A', and the head B' having the shank fitting loosely in the slot of the end piece $b'$, and provided with means for movably supporting it in the said slot, whereby provision is made for adjusting the tension of the saws and locking the parts of the frame together, substantially as herein shown and described.

3. The combination, with the frame A, composed of the parts A' A² and having slotted end pieces, b b', of the saw-heads B B', provided with a series of slits, b², the head B being rigidly secured to the end piece b, and the head B' having its shank fitting loosely in the slot of the end piece b' and provided with the screw-threaded ends b⁴ and the nuts b⁵ on the said ends, substantially as herein shown and described.

4. The combination, with a saw-frame having apertures in one of its side bars, of the gage E, provided with shanks adjustably secured in the apertures of the said side bar, substantially as herein shown and described.

NICHOLAS PETRY.

Witnesses:
PHIL L. THOMPSON.
JAS. A. NEWELL.